United States Patent [19]
Burkhardt

[11] Patent Number: 4,739,164
[45] Date of Patent: Apr. 19, 1988

[54] INCREMENTAL POSITION MEASURING INSTRUMENT WITH ERROR DETECTION

[75] Inventor: Horst Burkhardt, Truchlaching, Fed. Rep. of Germany

[73] Assignee: Dr. Johannes Heidenhain GmbH, Traunreut, Fed. Rep. of Germany

[21] Appl. No.: 883,163

[22] Filed: Jul. 8, 1986

[30] Foreign Application Priority Data

Jul. 26, 1985 [DE] Fed. Rep. of Germany ....... 3526735

[51] Int. Cl.$^4$ .......................... A45B 3/08; H01J 40/14
[52] U.S. Cl. .............................. 250/237 G; 33/125 A; 356/375
[58] Field of Search ......................... 33/125 A, 125 C; 250/231 SE, 237 G; 356/395, 398, 373–375

[56] References Cited

U.S. PATENT DOCUMENTS

| | | | |
|---|---|---|---|
| 3,578,979 | 5/1971 | Kawaguch | 250/237 G |
| 3,709,611 | 1/1973 | Taisne | 250/237 G |
| 3,713,139 | 1/1973 | Sanford et al. | 250/237 G |
| 3,768,911 | 10/1973 | Erickson | 250/237 G |
| 4,110,828 | 8/1978 | Baumgartner et al. | |
| 4,395,630 | 7/1983 | Ramsden et al. | 250/237 G |
| 4,628,201 | 12/1986 | Schmitt | 250/237 G |

FOREIGN PATENT DOCUMENTS

503346 3/1971 Switzerland .

Primary Examiner—Edward P. Westin
Assistant Examiner—Khaled Shami
Attorney, Agent, or Firm—Willian Brinks Olds Hofer Gilson & Lione Ltd.

[57] ABSTRACT

A position measuring arrangement for the measurement of the relative position of two objects shiftable with respect to one another wherein the measuring graduation is connected with the first object and is scanned by a scanning unit fastened to the second object. Four binary scanning signals are produced by the scanning unit with a predefined relative phase relationship. The signals are applied to a logic network for the generation of a linked binary signal. In the case of no errors, the linked binary signal is equal to a selected one of the four binary signals. In the event of an error, the linked binary signal is not equal to the selected one of the binary signals. The linked binary signal and the selected binary signal are applied to a comparator for a determination of equality and thereby a determination of the presence of errors.

11 Claims, 2 Drawing Sheets

INCREMENTAL POSITION MEASURING INSTRUMENT WITH ERROR DETECTION

BACKGROUND OF THE INVENTION

The present invention relates to an error-secure position measuring arrangement and method wherein a linked binary signal is generated from a plurality of binary scanning signals for error detection.

Error-secure position measuring devices are often used in processing machines to measure the relative position of a tool with respect to a workpiece that is to be processed and also in coordinate measuring machines for the determination of the position and/or the dimensions of a test object. The measuring device typically comprises a measuring scale and a scanning unit adapted to scan the measuring scale. The measuring scale is attached to one of the tool and workpiece and the scanning unit is attached to the other of the tool and workpiece. Relative movement between the tool and workpiece causes the scanning unit to move relative to the measuring scale and produce signals indicative of the relative position of the tool and workpiece.

Error security arrangements in incremental measuring systems are already known. Generally in these systems, unwanted interference pulses in the signal transmission channel are suppressed by transmitting the signals in complimentary form. The signals are transmitted as complimentary signals of like phase position on different channels to a signal receiver unit comprising a logic network. The logic network produces an output only when two complementary signals arrive simultaneously over both transmission channels (German published application AS No. 12 21 668). A disadvantage of this arrangement is that it is relatively complicated in construction since there must be two channels provided for each signal that is to be transmitted.

German patent DE-PS No. 20 22 151 describes an arrangement for the avoidance of errors in incremental measuring systems. The arrangement provides for the direct control of the mutual phase angle and amplitude levels of at least two scanning signals. The phase displaced scanning signals are fed simultaneously to an evaluating arrangement and to an error monitoring unit for the rectification of the scanning signals. A difference signal with a superposed constant threshold voltage is generated from the rectified scanning signals. If the difference signal falls below the threshold value, a flip-flop circuit responds to the sign of the difference signal, i.e. to the differential voltage zero, and triggers the error signal. This system has the disadvantage that it is not constructed in a manner secure against its own errors.

German document DE-OS No. 20 20 393 discloses an arrangement for error security in incremental measuring systems in which the control of the mutual phase angle and amplitude levels is performed directly on at least two scanning signals. Each of the scanning signals, phase displaced with respect to one another, is fed to a window trigger. The two window triggers, which have equal thresholds, generate output signals which drive a control circuit consisting of an AND-gate. The triggers are allocated to the middle ranges of the respective scanning signals. The AND-gate examines whether the switching states of the two window triggers coincide. If a coincidence is found, an error signal is produced. This arrangement also has the disadvantage that it is not constructed in a manner secure against its own errors.

From German patent DE-PS No. 22 07 224 there is known an error secured incremental position measuring arrangement in which a measuring graduation is scanned by a scanning device. The scanning device comprises four scanning units which generate four binary signals. The binary signals are phase displaced with respect to one another and each scanning unit comprises a scanning plate and an allocated photo-element. The scanning plate and photo-element are illuminated by an illuminating unit. A logic network, with known logic switching and linkage elements, generates a binary signal equal to a selected one of the four binary signals in response to an allowed combination of the binary signals. The allowed combination indicates an error free operation of the scanning units. A signal unequal to the selected binary signal is generated by the logic network in response to a forbidden combination of the binary signals. This condition indicates a faulty operation of the scanning units. The binary signal generated by the logic network and the selected binary signal are fed to respective counters. The outputs of the counters are compared by a comparator which is also responsive to a clock signal. If the counters are equal and the comparator is faultless, the comparator generates a signal. The signal indicates the faultless operation of the entire system and is equal in frequency to that of the clock signal. In addition to being applied to the comparator, the clock signal is also applied successively, and earlier in time, to a series of additional comparators. The additional comparators monitor the switching and linkage elements of the logic network for errors by checking, in each case, pairs of signals for equality. Although this arrangement is secure against its own errors, the arrangement is expensive, requiring two evaluating arrangements and two counters. In addition, the failure of the common illuminating unit for the four scanning units cannot always be recognized with the aid of the error signal.

It is an object of the present invention to provide an incremental position measuring arrangement of the type discussed above which is simply constructed and detects substantially all errors arising in actual practice.

SUMMARY OF THE INVENTION

The present invention is directed to an incremental position measuring arrangement and method wherein the arrangement is operative to detect errors by comparing a selected one of a plurality of scanning signals with a linked binary signal produced from the scanning signals.

According to this invention, a measuring arrangement, for the measurement of the relative position of two objects shiftable with respect to one another, comprises a measuring graduation connected to the first object and a scanning unit connected to the second object. The scanning unit is operative to scan the measuring graduation to generate a plurality of binary signals which are phase displaced with respect to one another. A linked binary signal is generated from the binary signals and is compared with a selected one of the signals for error detection.

A particular advantage of this invention is that, by securing against errors from the measuring device itself, the security of the position measurement is substantially improved. With the present invention, substantially all errors arising from the failure of an element of the measurement system can be detected. As a consequence, the quality of the workpieces produced in processing and measuring machines with these position measuring systems is improved and the number of workpiece rejects is considerably reduced. Further, since the measurement is more secure, the operating safety of the processing machine is improved. Thus, endangerment of the machine operator arising from measurement errors is virtually eliminated.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENT

Figure 1:
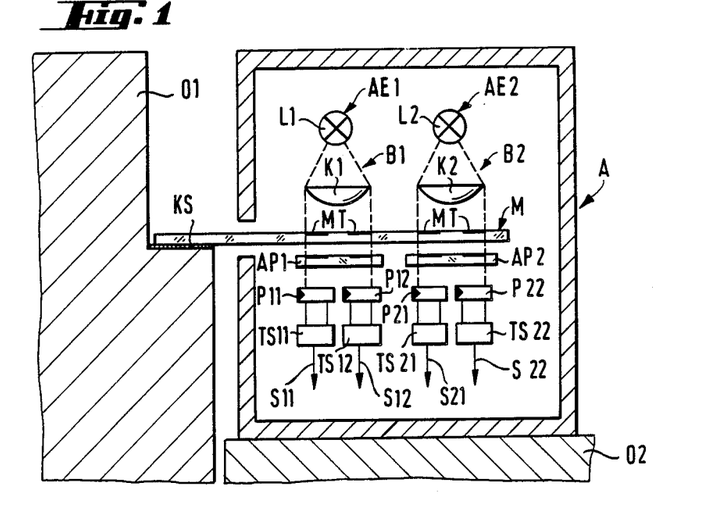
FIG. 1 shows a sectional representation of a photoelectric incremental length measuring arrangement of a preferred embodiment of the present invention.

Turning now to the drawings, FIG. 1 is a sectional representation of a photoelectric incremental length measuring instrument in which a scale M, comprising a measuring graduation MT, is connected with a first object 01 by means of an adhesive layer KS. A scanning unit A, for the scanning of the measuring graduation MT, is connected in a conventional manner with a second object 02. The objects 01, 02, which are displaceable with respect to one another and whose relative position is to be measured, comprise, for example, the machine components of a processing machine or measuring machine.

Figure 2:
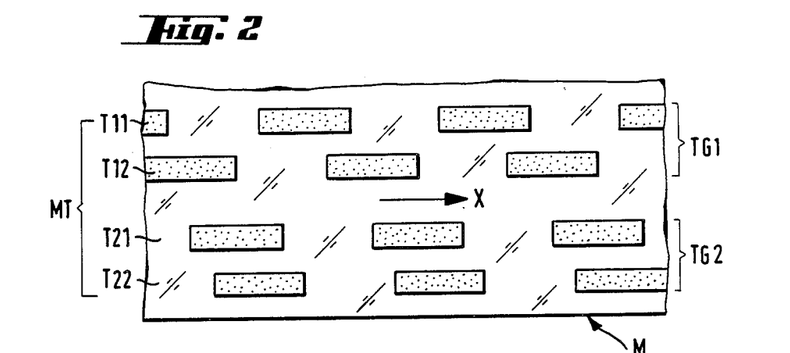
FIG. 2 is a plan view of a measuring scale used in the preferred embodiment of FIG. 1.

The measuring graduation MT of the scale M, as shown in FIG. 2, comprises a first and second graduation group TG1, TG2, respectively. The graduation group TG1 comprises a first graduation T11 and a second graduation T12. Similarly, the graduation group TG2 comprises a third graduation T21 and a fourth graduation T22. The scanning unit A comprises a first and second scanning unit AE1, AE2, respectively. The first scanning unit AE1 is operative to scan the first graduation group TG1 and the second scanning unit AE2 is operative to scan the second graduation group TG2.

The first scanning unit AE1, schematically represented in FIG. 1, comprises a first scanning plate AP1. The scanning plate AP1, shown in FIG. 3, comprises a first and second scanning graduation AT11, AT12, respectively. The scanning unit AE1 also comprises a first photo-element P11 allocated to the first scanning graduation AT11 and a second photo-element P12 allocated to the second scanning graduation AT12. A first illumination unit B1, comprising a first light source L1 and a first condenser K1, is provided in the first scanning unit AE1 for the illumination of the first and second scanning graduations AT11, AT12. A second scanning unit AE2, also shown in FIG. 1, comprises a second scanning plate AP2. The scanning plate AP2, shown in FIG. 3, comprises a third and fourth scanning graduation AT21, AT22, respectively. The scanning unit AE2 also comprises a second photo-element P21 allocated to the third scanning graduation AT21 and a second photo-element P22 allocated to the fourth scanning graduation AT22. A second illumination unit B2, comprising a second light source L2 and a second condenser K2, is provided in the second scanning unit AE2 for the illumination of the third and fourth scanning graduations AT21, AT22.

Figure 3:
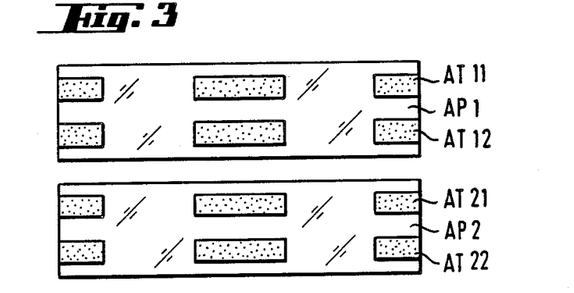
FIG. 3 is a plan view of two scanning plates used in the preferred embodiment of FIG. 1.

As shown in FIG. 2, the four graduations T11, T12, T21, T22 of the measuring graduation MT comprise alternating photo-impermeable (represented as dotted regions) and photo-permeable fields of equal grid constant. The second graduation T12 is displaced $3\pi/4$ with respect to the first graduation T11; the third graduation T21 is displaced $5\pi/4$ with respect to the first graduation T11; and the fourth graduation T22 is displaced $3\pi/2$ with respect to the first graduation T11. All displacements are in the measuring direction X with a graduation period of $2\pi$. The scanning graduations AT11, AT12, AT21, AT22 of the first and second scanning plates AP1, AP2, shown in FIG. 3, are identical with the four graduations T11, T12, T21, T22 of the measuring graduation MT, but present no relative displacement with respect to one another in the measuring direction X.

The light rays emitted by the first light source L1 of the first scanning unit AE1 pass through the first condenser K1 and on to the first and second graduations T11, T12. If the photo-permeable fields of the first and second graduations T11, T12 are appropriately positioned, the light rays continue through the first and second scanning graduations AT11, AT12 and fall upon the first and second photo-elements P11, P12. Similarly, the light rays emitted by the second light source L2 of the second scanning unit AE2 pass through the second condenser K2 and on to the third and fourth graduations T21, T22. If the photo-permeable fields of the third and fourth graduations T21, T22 are appropriately positioned, the light rays continue through the third and fourth scanning graduations AT21, AT22 and fall upon the third and fourth photo-elements P21, P22.

Figure 4:
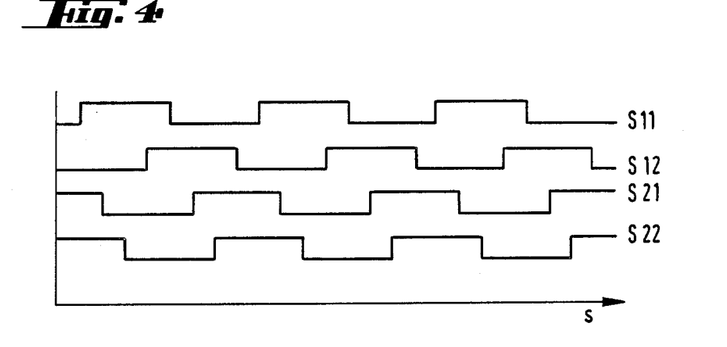
FIG. 4 is a representation of the four square binary signals produced by the preferred embodiment of FIG. 1.

During movement of the scanning unit A in the measuring direction X, the four photo-elements P11, P12, P21, P22 generate, independently of one another, four sinusoidal scanning signals in response to the modulated light rays from the light sources L1, L2. Each of the four scanning signals is fed to one of a respective trigger circuit TS11, TS12, TS21, TS22 for transformation into a square binary signal S11, S12, S21, S22, respectively. The square signals S11, S12, S21, S22 are represented in FIG. 4 as a function of the measuring path S. The first and second trigger circuits TS11, TS12 are located in the first scanning unit AE1 and the third and fourth trigger circuits are located in the second scanning unit AE2. As shown in FIG. 4, the second binary signal S12 is phase displaced with respect to the first binary signal S11 by 135°; the third binary signal S21 is phase displaced with respect to the first binary signal S11 by 225°; and the fourth binary signal S22 is phase displaced with respect to the first binary signal S11 by 270°. All displacements are in the measuring direction X and are attributable to the relative displacements of the graduations T11, T12, T21, T22 discussed above.

Figure 5:
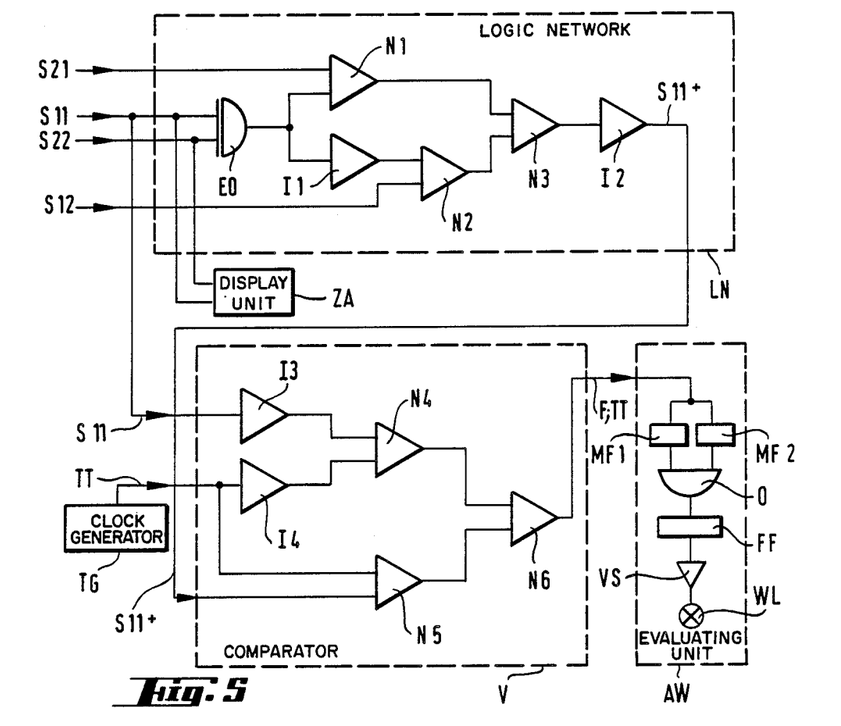
FIG. 5 is a schematic representation of the error detection circuit used in the preferred embodiment of the present invention.

An error detection circuit is schematically represented in FIG. 5. The circuit comprises a logic network LN and a comparator V connected to the output of the network LN. The logic network LN comprises an exclusive OR-gate EO, three NAND-gates N1, N2, N3 and two inverters I1, I2. The first binary signal S11 of the first trigger circuit TS1 is applied to the first input of the exclusive OR-gate EO and the fourth binary signal S22 of the fourth trigger circuit TS22 is applied to the second input of the exclusive OR-gate EO. The output of the exclusive OR-gate EO is connected with the second input of the first NAND-gate N1 and also to the first inverter I1. The output of the inverter I1 is applied to the second input of the second NAND-gate N2. The third binary signal S21 of the third trigger circuit TS21 is applied to the first input of the first NAND-gate N1. The second binary signal S12 of the second trigger circuit TS12 is applied to the first input of the second NAND-gate N2. The outputs of the first and second NAND-gates N1, N2 are connected with the first and second inputs of the third NAND-gate N3. The output of the NAND-gate N3 is applied to the input of the second inverter I2. The output of the second inverter I2 comprises a linked binary signal S11+ which, in the error free state, is equal to the selected first binary signal S11. The error free state occurs when the scanning units AE1, AE2 and the logic network LN operate faultlessly and no fouling or damage of the measuring graduation MT is present.

Error detection is achieved for the sequence of four binary signals S11, S12, S21, S22 shown in FIG. 4 by the operation of the logic network LN according to the logic relation:

$$\begin{aligned} S11^+ &= S12'S21'+S11'S12'S22'+S11'S21'S22+\\ &\quad S11S21'S22'+S11S12'S22\\ &= S12'S21'+S12'(S11S22+S11'S22')+\\ &\quad S21'(S11S22'+S11'S22) \end{aligned}$$

wherein the primed notation (') represents an inversion of the preceding indicated signal. The error-secure execution of the logic network LN is achieved by factoring out the inverted second binary signal S12' and the inverted third binary signal S21'.

An error analysis shows that all errors arising in consequence of the failure of one element of the measuring system are detected by a comparison of the linked binary signal S11+ of the logic network LN with the selected first binary signal S11. The term error is defined to encompass any of the following:

(a) One of the four binary signals S11, S12, S21, S22 remains, during relative movement of the scanning unit A with respect to the measuring graduation MT, constantly equal to the binary signal level "0" or "1". This error can occur from a faulty functioning of one of the two scanning units AE1, AE2 or from a fouling or damage of the measuring graduation MT;

(b) The output of one of the NAND-gates N1, N2, N3 or one of the inverters I1, I2 or the exclusive OR-gate EO remains constantly equal to the binary value "0" or "1" even during measuring movement of the scanning unit A with respect to the measuring graduation MT; and (c) Failure of the first illuminating unit B1 and/or failure of the second illuminating unit B2, resulting in one or more of the first, second, third and fourth binary signals S11, S12, S21, S22 to remain constantly equal to the binary signal level "0".

The following table, Table 1, sets out the sixteen theoretically possible combinations of the values "0" and "1" of the two signal levels of the four binary signals S11, S12, S21, S22. In addition, the corresponding values from the logic linkages in the logic network LN for the linked binary signal S11+ are also provided.

TABLE 1

| S11 | S12 | S21 | S22 | S11+ | Z |
|---|---|---|---|---|---|
| 0 | 0 | 0 | 0 | 1 | u |
| 0 | 0 | 0 | 1 | 1 | u |
| 0 | 0 | 1 | 0 | 1 | u |
| 0 | 0 | 1 | 1 | 0 | e |
| 0 | 1 | 0 | 0 | 0 | e |
| 0 | 1 | 0 | 1 | 1 | u |
| 0 | 1 | 1 | 0 | 0 | e |
| 0 | 1 | 1 | 1 | 0 | e |
| 1 | 0 | 0 | 0 | 1 | e |
| 1 | 0 | 0 | 1 | 1 | e |
| 1 | 0 | 1 | 0 | 0 | u |
| 1 | 0 | 1 | 1 | 1 | e |
| 1 | 1 | 0 | 0 | 1 | e |
| 1 | 1 | 0 | 1 | 0 | u |
| 1 | 1 | 1 | 0 | 0 | u |
| 1 | 1 | 1 | 1 | 0 | u |

There are eight allowed and eight disallowed combinations. The allowed combinations are represented in column Z by an "e" and the disallowed combinations are represented in column Z by a "u". The eight allowed combinations "e" occur, in the sequence of the four binary signals S11, S12, S21, S22 shown in FIG. 4, always within the eight sections of the $\pi/4$ (45°) portion of the full graduation period of, for example, the first binary signal S11. The disallowed combinations "u" do not occur in the sequence of the four binary signals S11, S12, S21, S22, and thus, also do not occur in the error free state. In the error free state, the eight allowed combinations "e" of the four binary signals S11, S12, S21, S22 are characterized by the equality between the selected first binary signal S11 and the linked binary signal S11+ generated by the logic network LN. In the faulty state, the disallowed combinations "u" of the four binary signals S11, S12, S21, S22 are characterized by the inequality between the selected first binary signal S11 and the linked binary signal S11+ delivered from the logic network LN.

To determine the equality or inequality between the first binary signal S11 and the linked binary signal S11+, the first binary signal S11 and the linked binary signal S11+ are applied to a comparator V. The comparator V is also connected to a periodic clock signal TT of clock generator TG and comprises a third and fourth inverter I3, I4 and a fourth, fifth and sixth NAND-gate N4, N5, N6. The first binary signal S11 is inverted by the third inverter I3 and applied to the first input of the fourth NAND-gate N4 and the periodic clock signal TT is inverted by the fourth inverter I4 and applied to the second input of the fourth NAND-gate N4. Simultaneously, the periodic clock signal TT and the linked binary signal S11+ are applied to respective inputs of the fifth NAND-gate N5. The outputs of the fourth and fifth NAND-gates N4, N5 are connected with respective inputs of the sixth NAND-gate N6. The sixth NAND-gate N6 therefore outputs the periodic clock signal TT when there are no errors and provides a nonperiodic error signal F of values "0" or "1" in the case when errors are present. The comparator V is constructed in a manner to be secure against its own errors so that in the case of a faulty operation of the comparator V there is likewise generated the nonperiodic error signal F. This type of comparator V is described in German patent DE-PS No. 22 07 224.

The output of the comparator V, the clock signal TT in the error free case and the error signal F in the non-error free case, is conducted to an evaluating unit AW which comprises a first and second parallel monostable flip-flop circuit MF1, MF2, an OR-gate O, a bistable flip-flop stage FF, an amplifier VS and a warning lamp WL. In the error free case, the clock signal TT is applied to the first and second parallel monostable flip-flop circuits MF1, MF2. The first flip-flop MF1 is displaced from its stable state into an unstable state by the rising edge of the periodic clock signal TT. Similarly, the flip-flop MF2 is displaced from its stable state into an unstable state by the falling edge of the periodic clock signal TT. Each flip-flop has a time constant such that the duration of the respective unstable state is somewhat greater than the period duration of the clock signal TT. The period duration is defined as the time spacing between each two consecutive rising or falling edges of the clock signal TT. In the error free case, the two flip-flop circuits MF1, MF2 are constantly held in their unstable states by the periodic clock signal TT. Therefore, the bistable flip-flop circuit FF is not driven by the OR-gate O to supply an actuating signal to the amplifier VS and warning lamp WL. However, in the event of an error, the periodic clock signal TT is replaced with the nonperiodic error signal F so that one of the flip-flop circuits MF1, MF2 switches from the unstable state into the stable state. The stable state output of any one of the circuits MF1, MF2 causes the flip-flop circuit FF to actuate the warning lamp WL.

Of the four binary signals S11, S12, S21, S22, the first binary signal S11 and the fourth binary signal S22 with relative phase displacement of −90° or the second binary signal S12 and the third binary signal S21 with relative phase displacement of +90° can be fed to a counter and display unit ZA with a direction discriminator. The direction discriminator cooperates with the counter to ensure that the increments are counted with the correct elgebraic sign. A display unit ZA connected to the counter indicates the position measuring values for the relative position of the two objects 01, 02 as measured by the scanning device A with the two independent scanning devices AE1, AE2.

The gates N1-N6 have been shown in FIG. 5 and described as NAND-gates. It should be understood that these gates, if desired, could be replaced by NOR-gates without detracting from the spirit of the invention.

In practice, errors in the binary signals S11, S12, S21, S22 may occur. These errors are represented in the following table, Table 2, and may be detected with the aid of the unallowed combinations "u" noted above. The faulty values occurring for the two signal levels of the four binary signals S11, S12, S21, S22 are underlined.

The logic network LN, like the comparator V, is constructed against its own errors.

TABLE 2

| S11 | S12 | S21 | S22 |
|---|---|---|---|
| <u>0</u> | 0 | 0 | 1 |
| 0 | <u>0</u> | 0 | 0 |
| 0 | 1 | <u>0</u> | 1 |
| 0 | 0 | 1 | <u>0</u> |
| <u>1</u> | 1 | 1 | 0 |
| 1 | <u>1</u> | 1 | 1 |
| 1 | 0 | <u>1</u> | 0 |
| 1 | 1 | 0 | <u>1</u> |

TABLE 2-continued

| S11 | S12 | S21 | S22 |
|---|---|---|---|
| <u>0</u> | 0 | 1 | 1 |
| <u>0</u> | 1 | 0 | 1 |
| <u>0</u> | 0 | 1 | <u>0</u> |
| 0 | <u>0</u> | <u>0</u> | 0 |
| 0 | <u>0</u> | <u>0</u> | <u>0</u> |
| 0 | 0 | <u>0</u> | <u>0</u> |
| <u>1</u> | <u>1</u> | 0 | 0 |
| <u>1</u> | 0 | <u>1</u> | 0 |
| <u>1</u> | 1 | <u>1</u> | <u>1</u> |
| 1 | <u>1</u> | <u>1</u> | 1 |
| 1 | <u>1</u> | <u>1</u> | <u>1</u> |
| 1 | 1 | <u>1</u> | <u>1</u> |

Of course, it should be understood that a wide range of changes and modifications can be made to the preferred embodiment described above. For example, the invention is operable not only in photoelectric incremental length or angle measuring systems, but also in magnetic, inductive or capacitive length or angle measuring arrangements. It is therefore intended that the foregoing detailed description be regarded as illustrative rather than limiting, and that it be understood that it is the following claims, including all equivalents, which are intended to define the scope of this invention.

I claim:

1. In an error secured incremental position measuring instrument, of the type for measuring the relative position of two objects shiftable with respect to one another and of the type comprising a measuring scale attachable to one of the objects; a measuring graduation located on the measuring scale; and a scanning unit attached to the other one of the objects and operative to scan the measuring graduation, the improvement comprising:

first means located in the scanning unit for generating a first, second, third and fourth signal in response to scanning the measuring graduation, the second signal phase displaced with respect to the first signal by 135°; the third signal phase displaced with respect to the second signal by 90°; and the fourth signal phase displaced with respect to the third signal by 45°;

second means for linking at least two of the first, second, third and fourth signals to form a linked signal; and third means for comparing the linked signal with a selected one of the first, second, third and fourth signals to determine the presence of an error in the measuring system.

2. The invention of claim 1 wherein the scanning unit comprises a first and second scanning unit optically and electrically independent of one another, the first and second scanning unit comprising a respective first and second illumination unit for illuminating the measuring graduation, the first scanning unit operative to generate the first and second signals and the second scanning unit operative to generate the third and fourth signals.

3. The invention of claim 1 wherein the second means comprises a logic network, the logic network comprising inputs connected to the respective first, second, third and fourth signals and an output, the logic network operative to produce the linked signal according to the logic equation:

$$S11^+ = S12'S21' + S12'(S11S22 + S11'S22') + S21'(S11S22' + S11'S22)$$

wherein S11 represents the first signal; S12 represents the second signal; S21 represents the third signal; S22 represents the fourth signal; and the prime notation (') represents an inversion of the preceding indicated signal.

4. The invention of claim 3 wherein the logic network comprises:
    an exclusive OR-gate comprising a first input, a second input and an output, the first input connected to the first signal and the second input connected to the fourth signal;
    a first NAND-gate comprising a first input, a second input and an output, the second input connected to the output of the exclusive OR-gate, the first input connected to the third signal;
    a first inverter comprising an input and an output, the input connected to the output of the exclusive OR-gate;
    a second NAND-gate comprising a first input, a second input and an output, the first input connected to the output of the first inverter, the second input connected to the second signal;
    a third NAND-gate comprising a first input, a second input and an output, the first input connected to the output of the first NAND-gate, the second input connected to the output of the second NAND-gate; and
    a second inverter comprising an input and an output, the input connected to the output of the third NAND-gate.

5. The invention of claim 1 wherein the improvement further comprises a clock generator operative to generate a periodic clock signal of a defined frequency and wherein the comparing means comprises an input and an output, the input connected to the periodic clock signal, the comparing means operative to produce a signal on the output of the same frequency as that of the clock signal in the event of no error and to produce a non-periodic error signal in the event of an error.

6. The invention of claim 5 wherein the comparing means comprises:
    a third inverter comprising an input and an output, the input connected to the first signal;
    a fourth inverter comprising an input and an output, the input connected to the periodic clock signal;
    a fourth NAND-gate comprising a first input, a second input and an output, the first input connected to the output of the third inverter, the second input connected to the output of the fourth inverter;
    a fifth NAND-gate comprising a first input, a second input and an output, the first input connected to the periodic clock signal, the second input connected to the linked signal; and
    a sixth NAND-gate comprising a first input, a second input and an output, the first input connected to the output of the fourth NAND-gate, the second input connected to the output of the fifth NAND-gate.

7. The invention of claim 1 wherein the improvement further comprises an evaluating unit, the evaluating unit comprising:
    a first flip-flop circuit comprising an input and an output, the input connected to the output of the comparator;
    a second flip-flop circuit comprising an input and an output, the input connected to the output of the comparator;
    an OR-gate comprising a first input, a second input and an output, the first and second inputs connected to the respective outputs of the first and second flip-flop circuits;
    a third flip-flop circuit comprising an input and an output, the input connected to the output of the OR-gate;
    an amplifier comprising an input and an output, the input connected to the output of the third flip-flop circuit; and
    a warning unit comprising an input, the input connected to the output of the amplifier.

8. The invention of claim 1 wherein the selected signal is the first signal.

9. The inventions of claim 1 wherein each of the first, second, third and fourth signals is a binary signal.

10. A method for detecting errors in an incremental position measuring instrument of the type for measuring the relative position of two objects shiftable with respect to one another and of the type comprising a measuring scale attachable to one of the objects; a measuring graduation located on the measuring scale; and a scanning unit attached to the other one of the objects and operative to scan the measuring graduation, the method comprising:
    generating a first, second, third and fourth signal in response to the scanning of the measuring graduation wherein the phase of the second signal is offset by 135° with respect to the first signal; the phase of the third signal is offset by 225° with respect to the first signal; and the phase of the fourth signal is offset by 270° with respect to the first signal;
    generating a linked signal according to the following relation:

$$S11^+ = S12'S21' + S12'(S11S22 + S11'S22') + S21'(S11S22' + S11'S22)$$

wherein S11 represents the first signal; S12 represents the second signal; S21 represents the third signal; S22 represents the fourth signal; and the prime notation (') represents an inversion of the preceding indicated signal; and
    comparing the linked signal with at least a selected one of the first, second, third and fourth signals to detect an error in one of the first, second, third and fourth signals.

11. In an incremental position measuring instrument, of the type for measuring the relative position of two objects shiftable with respect to one another and of the type comprising a measuring scale attachable to one of the objects; a measuring graduation located on the measuring scale; and a scanning unit attached to the other one of the objects and operative to scan the measuring graduation, the improvement comprising:
    the scanning unit operative to generate a plurality of binary scanning signals during scanning of the measuring graduation, each scanning signal displaced in phase by a respective predefined amount with respect to every other scanning signal;
    a logic network connected to the scanning signals and operative to generate a linked signal which is equal to a selected one of the scanning signals when the scanning signals and logic network are error free and which is unequal to a selected one of the scanning signals when any one of the scanning signals and logic network is in error; and
    a comparator operative to compare the linked signal with the selected one of the scanning signals and produce an error signal which indicates that one of the scanning signals and logic network is in error.

* * * * *

UNITED STATES PATENT AND TRADEMARK OFFICE
CERTIFICATE OF CORRECTION

PATENT NO. : 4,739,164
DATED : April 19, 1988
INVENTOR(S) : Horst Burkhardt

It is certified that error appears in the above-identified patent and that said Letters Patent is hereby corrected as shown below:

IN THE BACKGROUND OF THE INVENTION

In column 1, line 6, please delete "error-secure" and substitute therefor --error secure--.

In column 1, line 10, please delete "Error-secure" and substitute therefor --Error secure--.

IN THE DETAILED DESCRIPTION OF
THE PRESENTLY PREFERRED EMBODIMENT

In column 5, line 39, please delete "error-secure" and substitute therefor --error secure--.

In column 7, line 41, please delete "elgebraic" and substitute therefor --algebraic--.

In column 8, line 3, please delete the first occurrence of "1" and substitute therefor --0--.

In column 8, line 7, please delete the second occurrence of " " and substitute therefor --0--.

UNITED STATES PATENT AND TRADEMARK OFFICE
CERTIFICATE OF CORRECTION

PATENT NO. : 4,739,164
DATED : April 19, 1988
INVENTOR(S) : Horst Burkhardt

Page 2 of 2

It is certified that error appears in the above-identified patent and that said Letters Patent is hereby corrected as shown below:

In column 8, line 9, please delete first occurrence of "0" and substitute therefor --1--.

Signed and Sealed this

Thirty-first Day of October, 1989

Attest:

DONALD J. QUIGG

Attesting Officer

Commissioner of Patents and Trademarks